United States Patent Office 2,960,491

Patented Nov. 15, 1960

2,960,491

HEAT STABILIZED VINYL AND VINYLIDENE CHLORIDE POLYMER

Philip K. Isaacs, Brookline, Alexei Trofimow, Cambridge, and Donald M. Wacome, Lexington, Mass., assignors to W. R. Grace & Co., Cambridge, Mass., a corporation of Connecticut No Drawing. Filed Dec. 23, 1957, Ser. No. 704,296

16 Claims. (Cl. 260—45.85)

This invention relates to the heat stabilization of polymer compositions containing a substantial proportion of polymerized vinyl or vinylidene halides by the incorporation therein of certain sulfonated polycarboxylic acid salts.

Polymer compositions containing polymerized vinyl chloride and particularly vinylidene chloride are well known to be heat labile. When exposed to the high temperatures incurred during extrusion or molding, these compositions tend to decompose and become dark in color. The prior art has suggested numerous compounds to be incorporated in such polymer compositions as heat stabilizers. We have found these prior art heat stabilizers unsatisfactory in several respects. Many of them require high concentration to be effective; that is, on the order of 5–10% stabilizer based on the weight of the resin. Others are extremely toxic and hence not usable for films and bags which are to be used in wrapping food. Another characteristic which is particularly undesirable when preparing films and sheets for packaging use as well as filaments is the tendency of known stabilizers to render otherwise clear extruded polymers cloudy or hazy.

We have discovered how to prepare heat-stable polymer compositions containing polymerized vinyl or vinylidene halides by adding to these compositions a compound of the following structure:

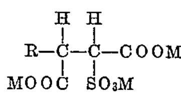

Where

R=H, $CH_2COOM$ or alkyl.

M=alkali metal.

Compounds of this type are relatively inexpensive, easy to prepare and efficient when used in very small quantities as low as 0.1%. More important, when added to the polymer in the manner hereinafter explained, these compounds add substantially no cloudiness to clear polymers and produce films which are sparkling-bright. Though it has been suggested to use sulfonated monocarboxylic salts such as disodium beta-sulfo-propionate and disodium beta-sulfo-butyrate, we have not found them satisfactory.

Among the compounds which are included within the above formula are the alkali metal salts of: ethane-1,2-dicarboxylic-1-sulfonic acid, propane-1,2-dicarboxylic-1-sulfonic acid, propane-1,2,3-tricarboxylic-1-sulfonic acid, butane-1,2-dicarboxylic-1-sulfonic acid, pentane-1,2-dicarboxylic-1-sulfonic acid, hexane-1,2-dicarboxylic-1-sulfonic acid, octane-1,2-dicarboxylic-1-sulfonic acid, and nonane-1,2-dicarboxylic-1-sulfonic acid. These salts are easily prepared by the addition of an alkali metal bisulfite to the di-alkali metal salts of dicarboxylic acids and the tri-alkali metal salts of tricarboxylic acids which contain alpha-beta unsaturation. Examples of the preparation of our salts are as follows.

*Example I*

One mole of sodium bisulfite was added to one mole of disodium maleate in a 20% water solution. The reaction is exothermic. Heating was continued for about 30 minutes while stirring at about 90–100° C. Completeness of the reaction was determined by testing with bromine. Upon completion the solution was dried in vacuo to produce the solid salt, which was the trisodium salt of ethane-1,2-dicarboxylic-1-sulfonic acid.

*Example II*

The same procedure was followed by adding sodium bisulfite to disodium itaconate to produce the trisodium salt of propane-1,2-dicarboxylic-1-sulfonic acid.

*Example III*

The procedure was repeated adding sodium bisulfite to trisodium aconitate to produce the tetrasodium salt of propane-1,2,3-tricarboxylic-1-sulfonic acid.

The longer chain alkyl-1,2-dicarboxylic-1-sulfonic acid salts, e.g., hexane-1,2-dicarboxylic-1-sulfonic acid tri salt, are prepared in the same manner, i.e., by adding alkali metal bisulfite to alkyl substituted maleic acid salts. Acids and anhydrides of the latter type are reported, for example, in Annalen vol. 461, page 170, and vol. 304, page 245. The conversion of the anhydrides and acids to the di salts is, of course, accomplished by simple mixing with alkali solution.

The above types of compounds have been found effective stabilizers over a range of concentrations from 0.1% to 5% or higher based on the weight of the polymer. The preferred concentration is 0.3 to 3%, and no improvement is generally seen employing concentrations above 5%. The compounds are efficacious whether or not such modifiers as plasticizers, light stabilizers, or coloring agents are also present in the polymer, and it is to be understood that polymers containing such modifiers are within the scope of our invention.

Polymer compositions containing a substantial proportion of polymerized vinyl or vinylidene halide are numerous, and include polyvinyl chloride, polyvinylidene chloride, polyvinyl bromide, polyvinylidene bromide, as well as copolymers of the above such as vinyl chloride-vinyl acetate, vinyl chloride-vinylidene chloride, vinyl chloride-vinylidene chloride-ethyl acrylate, vinyl chloride-vinyl cyanide, vinyl chloride-acrylic esters, vinyl chloride-methacrylic esters, vinylidene chloride-vinyl acetate, vinylidene chloride-vinyl cyanide, vinylidene chloride-acrylic esters, and vinylidene chloride-methacrylic esters. In the case of our copolymer and tripolymer compositions, the polymerized vinyl halide or vinylidene halide content either singly or in combination is in excess of 25% based on the total weight of the polymers. We choose this limit since polymer compositions with 25% or less vinyl or vinylidene halide do not generally darken by virtue of decomposition of the halides.

Where the clarity of the polymer produced is not an important consideration, the stabilizers of our invention may be added as a dry powder to the polymer particles and then milled to produce a homogeneous mixture. We have found, however, that when producing film in which a high degree of clarity is desired, this can be achieved best by adding an aqueous solution of these stabilizer salts to the finely divided polymer particles and then drying the mass at a moderate heat, for example, 70° C. The polymer particles to which the solution of stabilizer salt has been added may be in a dry state, or may be the still wet polymer cake obtained after coagulation and washing in the polymerization process. Drying of the treated polymer is carried out before extrusion or molding, in either case.

It is generally accepted that the conventional stabilizers impart haze to a polymer because of the comparatively large size of the stabilizer crystals. The crystals present in the fabricated polymer interfere with the transmission of light and cause scattering, with resultant haze. This difficulty has not been avoided even by extremely fine grinding or application from solution. We believe that the success of our "wet addition" process is brought about by the fact that our stabilizers dry to form an amorphous, glass-like product. When these stabilizers are deposited from solution and dried, the resultant glass-like particles are microscopically tiny and well dispersed. There are substantially no large crystals to scatter light and cause haze.

The following examples illustrate the excellent heat stability of our polymer compositions.

*Example IV*

A copolymer of 80% vinylidene chloride and 20% vinyl chloride in powder form was mixed in a mortar and pestle with the dried stabilizer salts which are named in the following table. The mixture was pressed into platens for 3 minutes at about 160° C., cooled, and stripped from the steel plates. The platen was then cut into strips 2 in. x ½ in. x 40 mils. These strips were then placed in a forced-draft oven on a Teflon sheet. Oven temperature was set at 150° C. The strips were removed at intervals of 20 minutes. A polymer sample without added stabilizer was also placed in the oven as a control, and the time required for the control to darken to a black color was taken as a standard by which the time necessary for the treated polymers to darken was measured. In normal extrusion processes, temperatures of the order of 150–160° C. are also employed, but the time in which the polymer is exposed to such heat is of the order of 3–6 minutes, so that no such drastic decomposition and darkening occur as do in these tests. Since the darkening of the polymer samples is a progressive process, however, the time necessary to darken to a given point (black) is a valid comparison of the efficiency of the stabilizer.

| Stabilizer | Concentration, percent | Temperature, ° C. | Time to Darken, minutes |
|---|---|---|---|
| None | 0 | 150 | 20 |
| Tripotassium salt of ethane-1,2-dicarboxylic-1-sulfonic acid | 0.3 | 150 | 60 |
| Trisodium salt of ethane-1,2-dicarboxylic-1-sulfonic acid | 0.3 | 150 | 60 |
| Trisodium salt of propane-1,2-dicarboxylic-1-sulfonic acid | 0.3 | 150 | 60 |
| Tetrasodium salt of propane-1,2,3-tricarboxylic-1-sulfonic acid | 0.3 | 150 | 60 |

*Example V*

The above process was followed using a copolymer of 80% vinylidene chloride and 20% octyl acrylate. The results are shown in the following table.

| Stabilizer | Concentration, percent | Temperature, ° C. | Time to Darken, minutes |
|---|---|---|---|
| None | 0 | 150 | 60 |
| Tripotassium salt of ethane-1,2-dicarboxylic-1-sulfonic acid | 0.3 | 150 | 120 |
| Trisodium salt of ethane-1,2-dicarboxylic-1-sulfonic acid | 0.3 | 150 | 120 |
| Trisodium salt of propane-1,2-dicarboxylic-1-sulfonic acid | 0.3 | 150 | 120 |
| Tetrasodium salt of propane-1,2,3-tricarboxylic-1-sulfonic acid | 0.3 | 150 | 120 |

*Example VI*

A polymer consisting of polyvinyl chloride (75%) with 25% dioctyl phthalate as a plasticizer was treated in the same manner.

| Stabilizer | Concentration, percent | Temperature, ° C. | Time to Darken, minutes |
|---|---|---|---|
| None | 0 | 160 | 90 |
| Tripotassium salt of ethane-1,2-dicarboxylic-1-sulfonic acid | 1.0 | 160 | 210 |
| Trisodium salt of ethane-1,2-dicarboxylic-1-sulfonic acid | 1.0 | 160 | 210 |
| Trisodium salt of propane-1,2-dicarboxylic-1-sulfonic acid | 1.0 | 160 | 210 |
| Tetrasodium salt of propane-1,2,3-tricarboxylic-1-sulfonic acid | 1.0 | 160 | 210 |

*Example VII*

A composition consisting of a copolymer of 85% vinyl chloride and 15% vinyl acetate was wet with a 10% water solution of the salts appearing in the following table. After drying, the polymer composition was pressed into platens and treated as outlined in Example IV. The results are as follows:

| Stabilizer | Concentration, percent | Temperature, ° C. | Time to Darken, minutes |
|---|---|---|---|
| None | 0 | 160 | 60 |
| Tripotassium salt of ethane-1,2-dicarboxylic-1-sulfonic acid | 3.0 | 160 | 120 |
| Trisodium salt of ethane-1,2-dicarboxylic-1-sulfonic acid | 3.0 | 160 | 120 |
| Trisodium salt of propane-1,2-dicarboxylic-1-sulfonic acid | 3.0 | 160 | 120 |
| Tetrasodium salt of propane-1,2,3-tricarboxylic-1-sulfonic acid | 3.0 | 160 | 120 |

To illustrate the improvement in clarity of our polymers obtained by our "wet addition" process, i.e., adding the stabilizer in solution, the following tests were performed.

*Example VIII*

A copolymer of 80% vinylidene chloride and 20% vinyl chloride was prepared in the conventional polymerization process. After coagulation, the wet coagulate was washed twice with hot water, dried at 70° C., and then separated into five portions. Portion 1 was washed with a 1% solution of trisodium salt of ethane-1,2-dicarboxylic-1-sulfonic acid. This mass was screened through a 12-mesh screen and dried at 70° C. in a circulating air oven. Portion 2 was washed with a 1% solution of sodium citrate, a well-known stabilizer. Portion 3 was washed with a 1% solution of tetrasodium pyrophosphate, another well-known heat stabilizer. Both of these portions were also screened and dried. Portion 4 was mixed in a mortar and pestle with the dry trisodium salt of ethane-1,2-dicarboxylic-1-sulfonic acid. The fifth portion was untreated. All five examples were mixed with 9% dibutyl sebacate plasticizer and allowed to stand at room temperature for a one-day period. The mixtures were then extruded at about 150° C. and blown in the manner shown in Stephenson Patent No. 2,452,080 to produce a film of a thickness of one mil. The film was then placed in a Hunter haze-meter. This is a standard light measuring device manufactured by the Hunter Associates Laboratory of Falls Church, Va., which measures percent haze. This value may be expressed as $$\%H=100\times\frac{\text{light transmitted through the film which is scattered}}{\text{scattered light}+\text{rectilinearly transmitted light}}$$

| Stabilizer | Percent | Method of Addition | Percent Haze | Increase over control (percent points) |
|---|---|---|---|---|
| None | 0 | | 3.6 | 0 |
| Trisodium salt of ethane-1, 2-dicarboxylic-1-sulfonic acid. | 0.3 | Dry polymer washed with solution. | 4.2 | 0.6 |
| Sodium citrate | 0.3 | do | 7.9 | 4.3 |
| Tetrasodium pyrophosphate. | 0.3 | do | 6.8 | 3.2 |
| Trisodium salt of ethane-1, 2-dicarboxylic-1-sulfonic acid. | 0.3 | Dry powder ball milled into polymer. | 10.2 | 6.6 |

Thus it is seen, in contrast to two of the more widely used heat stabilizers and in contrast to our stabilizer added in the dry condition, our stabilizer when added in solution produces very slight increase in haze over untreated polymer. Similar tests using the tripotassium salt of propane-1,2-dicarboxylic-1-sulfonic acid and the tetrasodium salt of propane-1,2,3-tricarboxylic-1-sulfonic acid were run with equivalent results.

We claim:

1. As a composition of matter, a vinyl type resin selected from the group consisting of polymers and copolymers formed from the polymerization of at least one monomer selected from the group consisting of vinyl halides, vinylidene halides, and monomers having a $CH_2=C$ group and which will copolymerize with either of the foregoing, wherein the proportion of the polymer formed from the total weight of vinyl halide and vinylidene halide monomer is from 25% to 100% of the total weight of the polymer and any balance is said copolymerizable monomer and at least 0.1% of a heat stabilizer therefore of the formula

```
     H  H
     |  |
  R—C—C—COOM
     |  |
  MOOC  SO3M
```

wherein M is an alkali metal and R is selected from the group consisting of —H, $—CH_2COOM$ and alkyl radicals having up to seven carbon atoms.

2. The composition of claim 1 wherein the stabilizer is present in an amount between 0.1 and 5 percent of the weight of the polymer.

3. The composition of claim 1 wherein the polymer is a copolymer of vinylidene chloride and vinyl chloride.

4. The composition of claim 1 wherein the polymer is a copolymer of vinylidene chloride and octyl acrylate.

5. The composition of claim 1 wherein the polymer is a copolymer of vinyl chloride and vinyl acetate.

6. The composition of claim 1 wherein the polymer is polyvinyl chloride.

7. The composition of claim 1 wherein M of the formula is sodium.

8. The composition of claim 1 wherein M of the formula is potassium.

9. The composition of claim 1 wherein R is —H.

10. The composition of claim 1 wherein R is alkyl.

11. The composition of claim 1 wherein R is $—CH_3$.

12. The composition of claim 1 wherein R is $$—CH_2COOM$$

13. The composition of claim 1 wherein R is $—C_4H_9$.

14. The composition of claim 3 wherein R is —H.

15. The composition of claim 3 wherein R is $—CH_3$.

16. The composition of claim 3 wherein R is $$—CH_2COOM$$

References Cited in the file of this patent

UNITED STATES PATENTS 2,473,708 Hayes ---------------- June 21, 1949

OTHER REFERENCES

Suter: Organic Chemistry of Sulfur, Wiley & Sons, Inc., New York, copyright 1944, pages 154–157.